Jan. 2, 1945.  J. R. LOWRY  2,366,273
MILKER CONSTRUCTION
Filed March 30, 1942

J. R. LOWRY
INVENTOR.

Dick and Bailey
ATTY'S.

Patented Jan. 2, 1945

2,366,273

UNITED STATES PATENT OFFICE 2,366,273

MILKER CONSTRUCTION

Jesse R. Lowry, Des Moines, Iowa, assignor to National Milker Company, Des Moines, Iowa, a partnership Application March 30, 1942, Serial No. 436,795

9 Claims. (Cl. 31—58)

This invention relates to mechanical milking machines and is more specifically concerned with the mounting of the receptacle into which the milk is transmitted after being extracted from the cow.

Mechanical milking devices are not new and there are a number of different brands available on the market today, each varying from the other in at least some details. In substantially each instance however, the device is so arranged that the container which receives the milk as it comes from the cow, stands on the floor of the dairy barn during the milking operation.

It is an object of this invention to provide a mechanical milking machine in which the milk receptacle is supported above the floor of the dairy barn or other place of milking.

Another object of this invention is to provide a construction for a milking apparatus whereby the container receiving the milk is suspended by its bail.

Another object of this invention is to provide a track mounted milking machine in which the milk receptacle is supported upon the main body of the machine which in turn is mounted upon an elongated track.

Another object of this invention is to provide a mechanical milker of the track type in which the container for receiving the milk automatically travels with the main body of the milker as the same is moved along the track to successive cows.

A further object of this invention is to provide a novel support structure for the milk pail of a milker.

Yet another object of this invention is to provide a novel lid construction for the milk receptacle of a mechanical milker.

An additional object is to provide a mechanical milker in which the milk pail is supported upon the handle of the lid covering said receptacle.

A still further object of this invention is to provide novel means for preventing a member from becoming accidentally disengaged from its support and for confining the rotation of said member relative to said support.

Yet another object is to provide a novel means for controlling the position of milker hose.

A further object of this invention is to furnish a milk receptacle support providing means for adjustment of the height and position of rotation of the milk pail.

In general in its preferred form my invention consists in the supporting of the milk receptacle of a mechanical milker upon a part of the milker which is movably mounted upon a carrier track supported in elevated position in the dairy barn. Normally, but not necessarily, the portion of the milker mounted upon said track and carrying the milk receptacle is the main body of the milker including the principal moving parts such as the power source and the vacuum source. If desired, of course, the milk receptacle may be independently mounted upon the track rather than being mounted upon a part of the balance of the apparatus, which in turn is mounted upon the track. I prefer it to provide an extensible rod construction suspended from one of the frame members of the main body of the milker and adapted to support the milk receptacle indirectly upon its lower end portion. A lid for the receptacle is equipped with suitable handle or hanger structure adapted to be suspended from the lower end portion of the extensible rod structure and the bail of the milk receptacle is supported by said handle, thus maintaining the receptacle in spaced relationship to the floor of the dairy barn.

In order that a clear and concise understanding of my invention may be had, reference should be made to the accompanying drawing forming a part of this specification in which Fig. 1 is a side elevational fragmentary view of a milking machine embodying one form of my invention.

Figure 4:
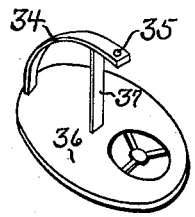
Fig. 4 is a perspective view of my novel receptacle lid, showing in detail the handle construction.

Referring now in greater detail to the drawing, I have used the reference character 10 to designate a wooden beam or other suitable support in the dairy barn or other place of milking from which the track hangers 12 depend. The track has been designated by the numeral 13. Adapted to travel along the track 13 are grooved wheels such as the sheave 14 from which the frame 15 of the milking machine is suspended by means of hangers 16. The suction cylinder has been indicated by the numeral 17 and the hose segments connecting the cylinder 17 to the milk receptacle 18 and the milk receptacle 18 to the teat cups 19 have been designated, respectively, by the numerals 20 and 21. It is standard equipment of this general type which I may employ as a mount for my novel milk receptacle support structure and hose control which I shall now describe. If desired an extension bracket 22 may be provided for immediate engagement by the hook 23 or its substitute. Preferably but not necessarily, the hook 23 or its replacement is detachable from the bracket 22 or the frame 15 if it engages the same directly. The tubular member 24 is suspended from the hook 23 by means of a coupling 25 having an opening in its end portion in which the shank 26 of the hook 23 is rotatably received. Disengagement of the hook 23 from the coupling 25 is prevented by the enlarged shoulder 27 on the lower end of the shank 26 of the hook 23. Longitudinally slidably received within the tube 24 is the rod 28; a set screw 29 is provided for holding the rod 28 in a desired extended position relative to the tube 24. A hook or other suitable holding means 30 may optionally be provided on the tube 24 for retaining the suction hose 20 in desired position. At the lower end of the rod 28 a hook 31 is furnished for indirectly supporting the receptacle 18. The upper portion or free end 32 of the hook 31 is reduced in size, providing the ledge 33 upon which the extended end of the handle member 34 rests, the latter being provided with an orifice 35 adapted to receive the reduced member 32. The handle 34 is attached at its base to the lid 36 and is also attached thereto by the brace member 37. The bail 38 of the receptacle 18 is supported upon the upper face of the handle 34 when in operative position whereby the receptacle 18 is suspended from said handle 34. The relative dimensions of the bail 38 and of handle 34 are preferably such that the lid 36 fits snugly upon the container 18 when the said bail 38 is in supported relationship to the handle 34, as appears clearly in Fig. 1 of the drawing. The handle 34 is held against accidental disengagement from the reduced member 32 by means of the safety means designated generally by the reference character 39 and illustrated in detail in Fig. 2. The unit 39 comprises a bar member 40 having the orifices 41 and 42 adapted, respectively, to slidably receive a portion of the lower end of the rod 28 and the reduced member 32. In placing the handle 34 in supported relationship to the ledge 33 the bar 40 is manually raised until it has disengaged the member 32, the hole 41 remaining, of course, in engagement with the rod 28. The extended end of the handle 34 is then placed upon the ledge 33 with the orifice 35 receiving the reduced member 32 and the bar 40 lowered until the reduced member 32 is again received in the orifice 42. Normally, when the handle 34 is being supported the bar 40 rests upon the top of said handle. Upwardly directed force applied to the bow of the handle 34 and to other parts of said handle spaced from the orifice 35 thereof causes the bar 40 to rise unevenly, inducing the said bar to frictionally engage either the rod 28, the reduced member 32 or both, whereby continued upward movement of said bar 40 and hence continued upward movement of the handle 34 relative said reduced member 32 is inhibited. If desired, a shoulder or boss 43 may be provided on the rod 28 for limiting the downward movement of the bar 40 on said rod 28, as for example, when said bar is pivoted in such a direction that the ledge 33 is not engaged thereby. Rotation of the handle 34 about the reduced member 32 may be controlled by the provision of a depending finger 44 secured to the bar 40. The parts may then be assembled in such a manner that the rod 28 confines the handle 34 on one edge and the finger 44 confines it on the other edge as appears clearly in Fig. 1. While the position of the bail 38 when supported on the handle 34 is not necessarily inclined as it appears in Fig. 1, such construction is preferable, for the reason that there is thus provided in effect a groove in which the directly supported portion of the bail 38 is at rest, preventing accidental disengagement of said bail from said handle. Also mounted upon the rod 28, I have shown a hose holder or control arm 45 having the hook 46 for directly receiving the hose, said hook being preferably pivotally mounted in said arm 45. The arm 45 and the hook 46 are, of course, optional and if included they may be mounted elsewhere than on the rod 28; for illustrative purposes I have shown the arm 45 slidable relative to said rod 28 and a set screw 47 has been furnished for at times preventing such sliding movement. The arm 45—hook 46 structure normally finds its greatest application in supporting the midsection portion of the teat hose 21, which otherwise frequently becomes twisted and/or which commonly sags onto the floor, thus becoming contaminated.

Figure 2:
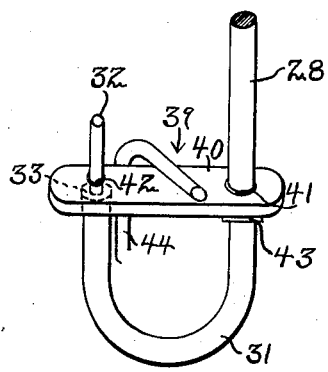
Fig. 2 is a fragmentary perspective view of the receptacle support structure showing in detail the lower end of one form of the same.
Figure 3:
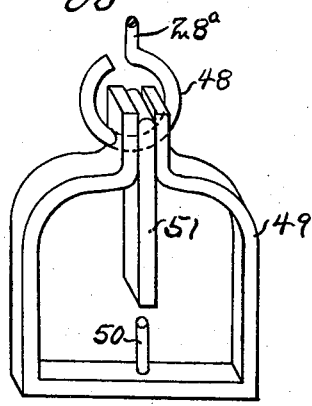
Fig. 3 is a view similar to Fig. 2 showing a modified form.
Figure 1:
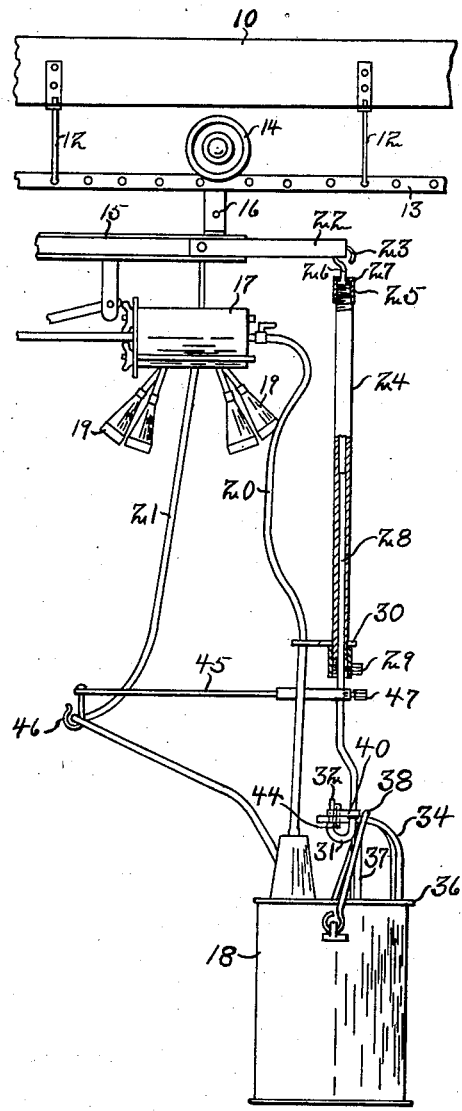

The structure illustrated in Fig. 3 may optionally replace the structure shown in detail in Fig. 2 as the support for the handle 34 in the apparatus illustrated in Fig. 1. The rod 28a, which may be supported similarly to the rod 28, has a hook 48 which supportingly engages the upper portion of the frame 49. An upstanding stud 50 is provided in said frame 49 for being received in the orifice 35 in the handle 34 similarly to the reduced member 32. A pivotally mounted depending member 51 provides a safety means for preventing accidental disengagement of the handle 34 from the stud 50. When placing the said handle 34 in engagement with the said stud 50 and at rest on the frame 49 the member 51 is manually swung from a vertical position in order to permit the extended end of the handle 34 to be introduced above the stud 50 preparatory to being positioned on said stud.

The convenience of my device and the sanitation which it provides are apparent. For one thing, there is no necessity for ever depositing the milk receptacle upon the floor of the dairy barn where it would be likely to pick up litter and other filth which would then come into contact with the hands of the operator as he empties the receptacle. Again the lid of the receptacle may be left mounted upon the supporting structure while the receptacle is being emptied at various times during the course of a milking. In the structure shown it is simply necessary to forcibly rotate the bail 38 outwardly until it disengages the handle 34. The receptacle is then entirely free to be carried to the milk depository. When returning the receptacle to operative engagement with the support structure, said receptacle is simply placed in a position generally beneath the lid 36 and the bail rotated upwardly until it rests on the general upper surface of the handle 34 or other place of support.

My novel support structure, safety means and receptacle lid may be employed in other connections than milking machines as may also my novel construction of supporting a receptacle bail on super-structure of the receptacle lid.

In the ensuing claims the terms "mounted" and "supported" and variations thereof are intended to include indirect as well as direct supportings and mountings.

While I have described an embodiment of my invention and certain modifications thereof for illustrative purposes, one skilled in the art will be able to make modifications, variations, and eliminations therein, and this without departing from the true spirit and scope of my invention. I wish therefore to be limited herein only by the appended claims.

I claim:

1. In a device of the type described, a hanger structure having a generally U-shaped lower end portion, one of the arms of said U extending upwardly further than the other, a ledge spaced from the upper end of the shorter arm of said U, a bar having openings adapted to slidably receive the arms of said U, and a depending finger on said bar.

2. In a device of the type described, a U-shaped structure one of the arms of which extends upwardly further than the other, a shoulder spaced from the upper end of the shorter arm of said U, a member having an opening for receiving the upper end portion of said shorter arm to provide for the support of said member on said shoulder and a bar having openings for receiving the arms of said U, said bar being positioned above said member when the latter is in a supported position on said shorter arm to hold said member on said shorter arm.

3. In a device of the type described, a U-shaped structure one of the arms of which extends upwardly further than the other, a shoulder spaced from the upper end of the shorter arm of said U, a member having an opening adapted to receive the upper end portion of said shorter arm to provide for the support of said member on said shoulder, a bar having openings adapted to receive the arms of said U, said bar being positioned above said member when the latter is in a supported position on said shorter arm to hold said member on said shorter arm, and a depending finger on said bar engageable with said member to limit its rotation about said shorter arm.

4. In a structure for supporting a milking machine including a track and a carrier structure movably mounted upon said track, an extensible upright hanger structure, means rotatably supporting said hanger structure adjacent its upper end portion from said carrier for rotation about a vertical axis independently of any movement of said carrier structure, means for adjustably extending the lower end portion of said hanger structure, and means adjacent said lower end portion adapted to support a receptacle for milk.

5. In a structure for supporting a milking machine including a track and a carriage movably supported upon said track, a hanger unit depending from said carriage and including a telescoping tube member and a rod member, means rotatably supporting the upper end of one of said members from said carriage for rotation about a vertical axis, means for holding the other of said members in various extended positions from the lower end of said one member for rotation with said one member, and means adjacent the lower end portion of said other member adapted to support a receptacle for milk.

6. In a structure for supporting milking machine apparatus, a depending tube supported from said milking machine apparatus and rotatable about a vertical axis, an elongated member slidably receivable within said tube and adjustably movable to extended positions from the lower end of said tube, means for holding said elongated member in an adjusted position, a receptacle lid, and means on top of said lid adapted to be supported at the lower end portion of said elongated member.

7. In a supporting structure for milking apparatus having a vacuum hose and a teat cup connector hose, an upright unit including a tubular member and an elongated member slidably received within said tubular member and adjustably extensible from the lower end of said tubular member, means rotatably supporting the upper end of said tubular member from said milking apparatus for rotation about a vertical axis, means for holding said elongated member in an adjusted position, means mounted on said unit for supporting said vacuum hose, a substantially horizontal arm mounted adjacent one of its ends on said unit and having a hose-supporting portion adjacent its other end for holding the teat cup connector hose, an upstanding member adjacent the lower end portion of said elongated member, a horizontal support on said upstanding member spaced downwardly from the upper end thereof, a receptacle lid, a super structure on said lid adapted to be supported on said horizontal support and to support a receptacle bail, means for holding said super structure in a supported position on said horizontal support comprising a bar slidably received on the lower end portion of said elongated member and having an opening adapted to receive said upstanding member above said super structure, and means on said bar for limiting the rotation of said super structure about said upstanding member.

8. In a supporting structure for milking apparatus including a milk receptacle, a depending unit including a tubular member and an elongated member slidably received within said tubular member and extensible to adjusted positions from the lower end of said tubular member, means supporting said tubular member for rotation about a vertical axis, means for holding said elongated member in an adjusted position, an upstanding member adjacent the lower end portion of said elongated member, a horizontal support on said upstanding member spaced downwardly from the upper end thereof, a receptacle lid, a superstructure on said lid adapted to be held in a supported position on said horizontal support and to support a bail for said receptacle, and means for holding said super structure on said horizontal support comprising a bar slidable on the lower end portion of said elongated member and having an opening therein to receive said upstanding member above said super structure.

9. In a supporting structure for milking apparatus having a milk receptacle, a member depended from said structure having its lower end portion terminating in a hook, said hook having a shoulder adjacent the free end thereof, a lid for said receptacle, a handle on said lid having an upright portion and an integral horizontal portion, with said horizontal portion having an opening therein to receive the free end of said hook to support the handle on said shoulder, means for holding said handle against pivotal movement about the free end of said hook, and a bail for said receptacle movable to a supported position on said horizontal portion when said receptacle is in a position to be covered by said lid.

JESSE R. LOWRY.